US009294946B2

(12) United States Patent
Shuman et al.

(10) Patent No.: US 9,294,946 B2
(45) Date of Patent: Mar. 22, 2016

(54) ADAPTIVE AUTOMATIC DETAIL DIAGNOSTIC LOG COLLECTION IN A WIRELESS COMMUNICATION SYSTEM

(75) Inventors: Mohammed Ataur Rahman Shuman, San Diego, CA (US); Daniel S. Abplanalp, San Diego, CA (US); Amit Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 666 days.

(21) Appl. No.: 12/870,427

(22) Filed: Aug. 27, 2010

(65) Prior Publication Data
US 2012/0051228 A1 Mar. 1, 2012

(51) Int. Cl.
H04W 24/08 (2009.01)
H04L 12/24 (2006.01)
H04W 4/06 (2009.01)

(52) U.S. Cl.
CPC ............ *H04W 24/08* (2013.01); *H04L 41/069* (2013.01); *H04L 41/0677* (2013.01); *H04W 4/06* (2013.01)

(58) Field of Classification Search
CPC ................................................... H04W 24/08
See application file for complete search history.

(56) References Cited

U.S. PATENT DOCUMENTS

| 5,828,882 | A  | * | 10/1998 | Hinckley ...................... 719/318 |
| 8,165,028 | B1 | * | 4/2012  | Yuhan et al. .................. 370/242 |
| 8,311,087 | B2 | * | 11/2012 | Fok et al. ...................... 375/224 |
| 2004/0042470 | A1 | * | 3/2004 | Cooper et al. ................. 370/401 |
| 2004/0052212 | A1 | * | 3/2004 | Baillargeon .................. 370/235 |
| 2004/0225381 | A1 | * | 11/2004 | Ritz et al. ........................ 700/26 |
| 2005/0107095 | A1 | * | 5/2005 | Samuel ................. H04W 24/00 455/456.5 |
| 2005/0114504 | A1 | * | 5/2005 | Marolia et al. ................ 709/224 |
| 2005/0169186 | A1 | * | 8/2005 | Qiu ..................... H04L 41/0631 370/242 |

(Continued)

FOREIGN PATENT DOCUMENTS

| JP | 2009253403 A | 10/2009 |
| JP | 2009253403 A | * 10/2009 ............ H04W 24/08 |

(Continued)

OTHER PUBLICATIONS

ETSI MCC: List of Change Requests agreed , at RAN2#40, 3GPP Draft; R2-040380, 3rd Generation , Partnership Project (3GPP), Mobile Competence Centre ; 650, Route Des Lucioles ; F-06921 Sophia-Antipolis Cedex ; France, vol. RAN WG2, No. Sophia Antipolis, France; Feb. 8, 2004, XP050125267.

(Continued)

*Primary Examiner* — John Pezzlo
*Assistant Examiner* — Hooman Houshmand
(74) *Attorney, Agent, or Firm* — Raphael Freiwirth

(57) ABSTRACT

Systems, methods, and computer-readable storage media are disclosed that allow adaptive automatic detail diagnostic log collection for self-diagnosis and auto-recovery. In an embodiment, a group communication server determines that a fault has occurred with a group communication between wireless communication devices. The group communication server determines a set of events to log based on the fault, and instructs components that host the group communication to begin logging a set of events. Upon determining that logging the set of events can no longer be performed, such as due to too high of a load within a component of the group communication, the group communication server adapts the logging by logging a second set of events that will not cause too high a load, and can dynamically when resources become available.

25 Claims, 8 Drawing Sheets

(56) References Cited

U.S. PATENT DOCUMENTS

| | | |
|---|---|---|
| 2006/0128371 A1* | 6/2006 | Dillon et al. ............... 455/423 |
| 2006/0205514 A1* | 9/2006 | Cockerille et al. ............ 463/43 |
| 2006/0233114 A1* | 10/2006 | Alam et al. ................. 370/252 |
| 2007/0180089 A1* | 8/2007 | Fok et al. ................... 709/223 |
| 2007/0207800 A1 | 9/2007 | Daley et al. |
| 2008/0056125 A1* | 3/2008 | Kneckt et al. ............... 370/229 |
| 2008/0056178 A1* | 3/2008 | Alexander et al. ........... 370/328 |
| 2008/0263398 A1* | 10/2008 | Mori et al. .................. 714/25 |
| 2008/0294384 A1* | 11/2008 | Fok et al. ................... 702/187 |
| 2009/0275343 A1 | 11/2009 | Monnes et al. |
| 2010/0197238 A1 | 8/2010 | Pathuri et al. |
| 2011/0154023 A1* | 6/2011 | Smith et al. ................. 713/155 |
| 2011/0167470 A1* | 7/2011 | Walker et al. ............... 726/1 |

FOREIGN PATENT DOCUMENTS

| | | |
|---|---|---|
| WO | 2009054847 A1 | 4/2009 |
| WO | 2009134604 A1 | 11/2009 |
| WO | WO-2009134454 A1 | 11/2009 |

OTHER PUBLICATIONS

International Search Report and Written Opinion—PCT/US2011/047259—ISA/EPO—Dec. 14, 2011.

European Search Report—EP13192954—Search Authority—Munich—Feb. 17, 2014.

NEC et al: "UE assistance for , self-optimizing of network" , 3GPP Draft; R2-072432, 3rd Generation , Partnership Project (3GPP), Mobile , Competence Centre ; WG2, No. Orlando, USA; Jun. 22, 2007, XP050135267 [retrieved on Jun. 22, 2007].

* cited by examiner

ADAPTIVE AUTOMATIC DETAIL DIAGNOSTIC LOG COLLECTION IN A WIRELESS COMMUNICATION SYSTEM

BACKGROUND

1. Field of the Invention

The present invention relates to the logging of events in a wireless communications system. More specifically, the present invention relates to adapting the type and amount of logging of the wireless communications system based on available resources of the system, and the ability to log specific events, both of which may vary over time.

2. Description of the Related Art

Wireless communications systems allow for communication by mobile telecommunications devices, such as cellular phones, PDAs, and mini-laptops, with other mobile telecommunications devices as well as wired telecommunications devices on a POTS ("plain ordinary telephone system").

There exists a wireless telecommunications service that provides a quick one-to-one or one-to-many communication that is generically referred to as "Push-To-Talk" (PTT) capability. This is sometimes referred to as a "group communication." The specific PTT group of recipient devices for the communicating mobile device is commonly set up by the carrier. A PTT communication connection is typically initiated by a single button-push on the mobile device that activates a half-duplex link between the speaker and each member device of the group, and once the button is released, the device can receive incoming PTT transmissions. Other methods for establishing a PTT or group communication may be through potentially any existing mobile device. These group communications may also be full-duplex or transition between half-duplex and full-duplex communications between the mobile device and a group communication server. Existing PTT systems have advantages over traditional cellular systems because they have faster call setup times, e.g., setup times ideally in the range of 1 second as opposed to cellular voice channels that can take more than 5 seconds to establish. In some arrangements, the PTT speaker will have the "floor" where no other group member can speak while the speaker is speaking. Once the speaker releases the PTT button, any other individual member of the group can engage his or her PTT button and he or she will have the floor. Generally speaking, the PTT system uses standard voice-over Internet Protocol (VoIP) technologies. Voice information is sent in digital form over IP-based data networks. In PTT scenarios, instead of using the standard cellular infrastructure, a call is formed by combining separate point-to-point connections between each IP endpoint in the network. Initiating the PTT system generates a call to the target device. The call originator's voice can be sent through the carrier's network to the target handset.

One of the main issues with efficient and timely troubleshooting and diagnostic ability of a wireless communications system, such as a PTT system, is not having the diagnostic logs needed to troubleshoot the problem available from the system that contains the diagnostic information of the reported problem. Most of the time, the telecommunications network provides key performance indicator ("KPI") or operation and maintenance ("O&M") measurements to indicate the problem in the network, such as high call setup failure, high call drop rate, or low bandwidth. However, in order to quickly resolve the reported problem or performance degradation, network engineers need the right set of logs capturing detailed diagnostic information of the failure. Due to the nature of a telecommunications node, it is not possible to continuously collect detailed diagnostic information due to limited bandwidth and/or limited mobile device resources, e.g, memory, CPU utilization, etc. Often times, after a reported problem, a network operations and maintenance team tries to troubleshoot the problem and, based on the results of initial troubleshooting, the network operations team starts collecting detailed diagnostic logs using pre-defined filter(s) or template(s).

Sometimes, it is difficult to collect the desired log because the previously reported problem is not currently occurring, due to the time difference between when it was reported and when the diagnostic logging was manually started. It may also be difficult to collect the desired log because not all calls were logged due to a limitation of the system resources of the system (such as communications links, server or mobile resources), resulting in the server logging only some calls (for instance, based on an algorithm, such as one call out of 100 attempts), and the desired logs not being collected.

Another issue may be not starting the log with the filter that would best diagnose the problem. A further issue with diagnostic logging deals directly with the system resources that performing such logging consumes. Logging the occurrence of events requires the use of system resources—such as the load of a central processing unit (CPU) of the system, and the storage space of the system available for logging. These system resources available for logging may change dynamically. For instance, these available system resources may vary as a function of the number of active calls in the system.

As the available system resources change, there may not be enough system resources available to log all of the occurrence of events desired. When there are not enough system resources available to log all of the occurrence of events desired, the prior art teaches that no logging may occur.

It would, therefore, be advantageous to provide techniques for adaptive logging of the occurrence of error events, where such techniques are able to adjust the amount of logging based on the amount of available system resources.

SUMMARY

Briefly described, the present invention includes a system, method, and computer-readable storage media that provide adaptive logging of the occurrence of events. In an embodiment, in response to a fault occurring, the wireless communications system determines a first set of events to log, and commences logging the occurrence of that first set of events. At a later point in time, the wireless communications system determines that a threshold of system resource usage has been exceeded. In response to determining that the threshold has been reached, the wireless communications system then determines a second set of events to log, the second set of events differing from the first set of events. In an embodiment, this second set of events consists of a subset of the first set of events. The wireless communications system then changes (or "adapts") to logging the occurrence of the second set of events.

In another embodiment, in response to a fault occurring, the wireless communications system attempts to log three events of 10 events that may be logged. Let event A be the event of the 10 events that is most desired to be logged when this fault occurs, but event A cannot be logged. The wireless communications system adapts by beginning by logging a different set of events, consisting of events B, C, and D, or the set of events to log most desired when event A cannot be logged. Later, the wireless communications system determines that event A can be determined, but there are not sufficient available system resources to log event A along with events B, C, and D. In response, the wireless communications system adapts by logging events A, C, and D (a set of events for which there are sufficient system resources to log), and dropping event B, which is the least desired event to log of events B, C, and D. When the wireless communications system determines that a sufficient amount of events have been logged, it ends the logging process.

The present system, method, and computer-readable storage media are therefore advantageous in that, by providing the ability to log the occurrence of events with a finer granularity than "log" and "do not log," the likelihood is increased that logs will be captured that enable an administrator of the system to determine the source of a abnormality in the system.

Other objects, features, and advantages of the present invention will become apparent after review of the Brief Description of the Drawings, Detailed Description, and the Claims.

DETAILED DESCRIPTION

Figure 1:
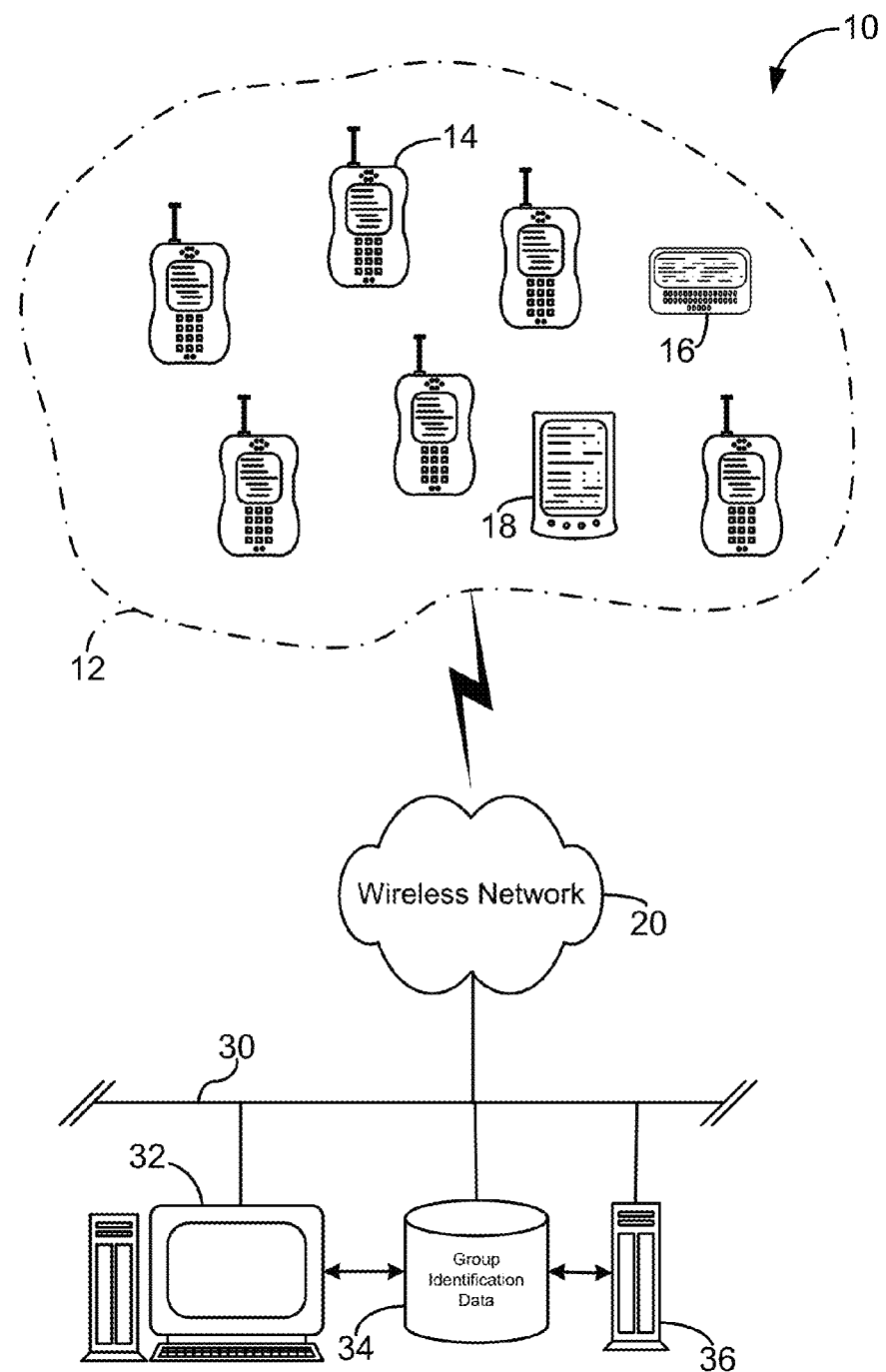
FIG. 1 depicts a representative diagram of a wireless network with a designated group of wireless telecommunications devices communicating with a group communication server and other computer devices across the wireless network.

In this description, the terms "mobile communication device," "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "group communication" means a point-to-point or point-to-multipoint communication sent between wireless communication devices across true or virtual half-duplex channels, or full-duplex channels. The term "exemplary" means that the disclosed element or embodiment is only an example, and does not indicate any preference. Further, like numerals refer to like elements throughout the several views, and the articles "a" and "the" includes plural references, unless otherwise specified in the description.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software, or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

With reference to the figures in which like numerals represent like elements throughout, FIG. 1 illustrates one embodiment of the system 10 comprising one or more wireless telecommunications devices. A push-to-talk (PTT) group 12 may be formed for sharing group media among the one or more wireless telecommunications devices. The PTT group may further comprise devices such as the telephone 14, smart pager 16 and personal digital assistant (PDA) 18, with other wireless telecommunications devices across a wireless network 20. In the system 10, each wireless telecommunications device 14, 16, 18 is capable of selectively directly communicating across the wireless communication network 20 with a target set of one or more other wireless telecommunications devices of the plurality. For example, the target set for mobile telephone 14 can be all devices in the communication group 12 or a subset thereof, such as pager 16 and PDA 18.

In this embodiment, the wireless telecommunications device (such as mobile telephone 14) informs the group communication computer device, shown here as server 32, which is present on a server-side LAN 30 across the wireless network 20, that the wireless device is present, i.e. accessible, on the wireless network 20. The group communication computer device 32 can share this information with the set of target wireless telecommunications devices designated by the first wireless telecommunications device, or can share with other computer devices resident on the server-side LAN 30 or accessible across the wireless network 20. The group communication computer device 32 can have an attached or accessible database 34 to store the group identification data for the wireless devices. A data store 36, shown here as file management server, may also be present on the server-side LAN 30. It should be appreciated that the number of computer components resident on server-side LAN 30, or across the wireless network 20 (which, in an embodiment, comprises the INTERNET), are not limited.

The direct communication, such as a PTT communication, can be established through a half-duplex channel between the communicating wireless telecommunications device 14, 16, 18 and the one or more other wireless telecommunications devices of the target set. Also, the group communication computer device 32 can attempt to bridge the requested direct communication with the target set if at least one of the wireless telecommunications devices of the target set have informed the group communication computer device 32 of their presence on the wireless network 20.

The group communication computer device 32 can also inform the wireless telecommunications device 14,16,18 of the inability to bridge a direct communication to the target set 12 upon none of the wireless telecommunications devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In overview, the system 10 includes at least one wireless communication device, such as mobile telephone 14, that is a member of a communication group 12 of wireless communication devices that communicate with each other in direct group communications across a wireless communication network 20, the at least one wireless communication device configured to selectively send group-directed communications to other members of the communication group 12. At least one group communication computer device or server 32 is configured to store information on communication groups 12 on the wireless communication network 20, the information including the identity of the specific member wireless communication devices of one or more communication groups. The group communication computer device 32 is further configured to selectively receive group-directed communications from a sending wireless communication device, such as mobile telephone 14, of a communication group 12 and send the group-directed media to the other member wireless communication devices of the communication group 12 for the sending wireless communication device.

The system 10 can further include a data store 36 in communication with the group communication computer device(s) 32, with the group communication computer device 32 configured to send group-directed media to the data store 36. The data store 36 can configured to receive the group-designated media from a wireless communication device (such as mobile phone 14) and selectively permit members of the communication group 12 for which the group-directed media was sent to access the stored group-directed media across the wireless communication network 20.

The group-directed media can be graphic media, such as pictures in JPEG, TIF, and the like, audio files such as MP3, MP4, WAV, and the like. The media can also be streaming media, such as a multimedia application (PowerPoint, MOV file, and the like). The group-directed media can also be streaming media, or an interactive session on another computer device on the wireless communication network 20, such as a game hosted on data store 36 or private bulletin board. For example, participants in a game can chat via the group-communication about the ongoing game. Also, the group-directed media could be video conferencing among members of the communication group wherein the picture of the speaker is broadcast to the other group members in substantial real-time, or in delay.

As is further described herein, the wireless communication device 14, 16, 18 can be engaged in a group communication with the member wireless communication devices of the communication group 12, and send group-directed media during the group communication in the same communication session, or independently therefrom. Alternately, the group-directed media can be sent independently of the group-communication session.

Figure 2:
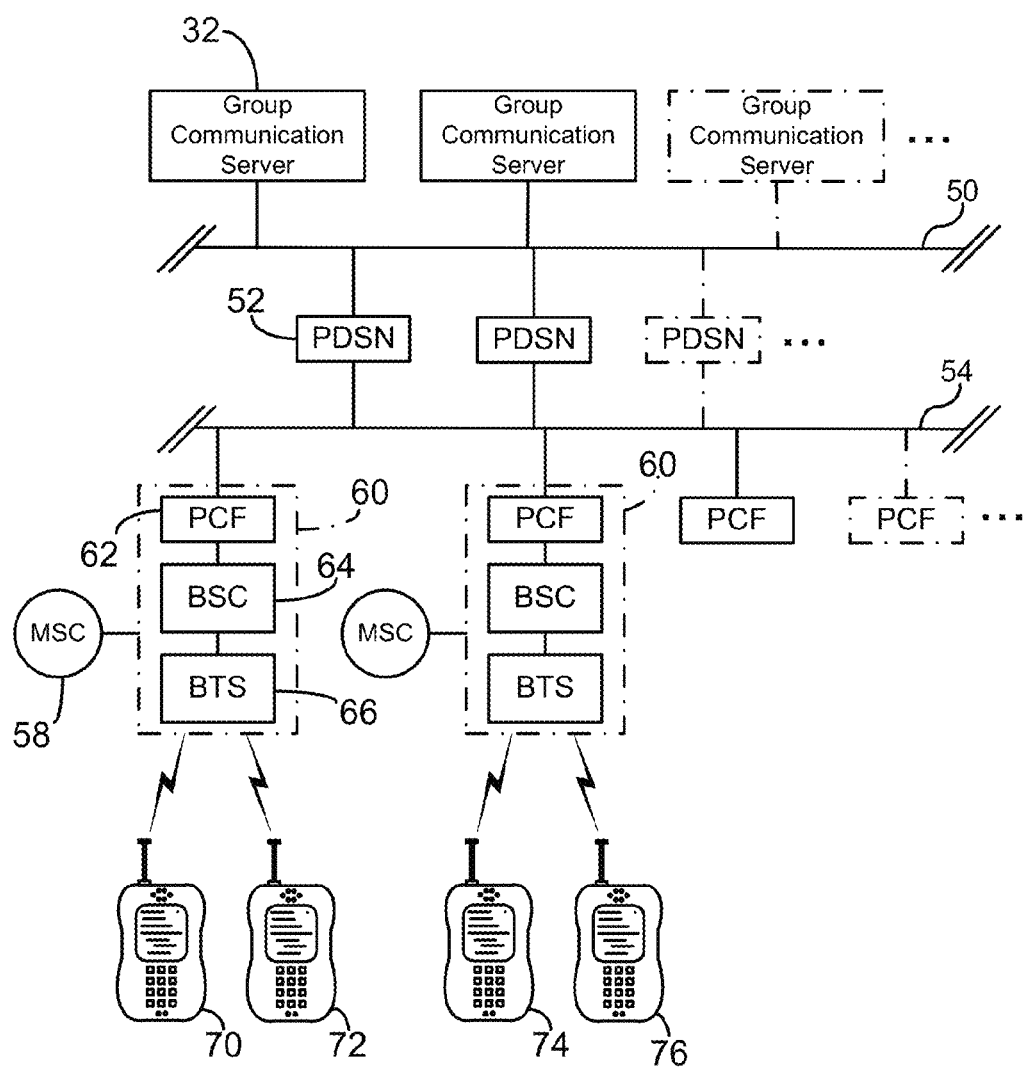
FIG. 2 depicts a representative diagram of one embodiment of a wireless network in a common cellular telecommunications configuration, having a group communication server control communications between the wireless telecommunications devices of group members.

FIG. 2 is a representative diagram of one embodiment of a wireless network in a common cellular telecommunications configuration, having a series of group communication computer devices (group communication servers) 32 that control communications between the wireless communication devices of set group members (devices 70, 72, 74, 76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service providers packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70, 72, 74, 76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunications devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a group communication 12 (FIG. 1), the wireless communication device can directly connect with the other member of the group communication and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control or direct the communication because it will typically be the only server-side 30 component that is aware of and/or can retrieve the identity of the members of the communication group, or direct the identity of the members of the communication group 12 to another computer device.

Figure 3:
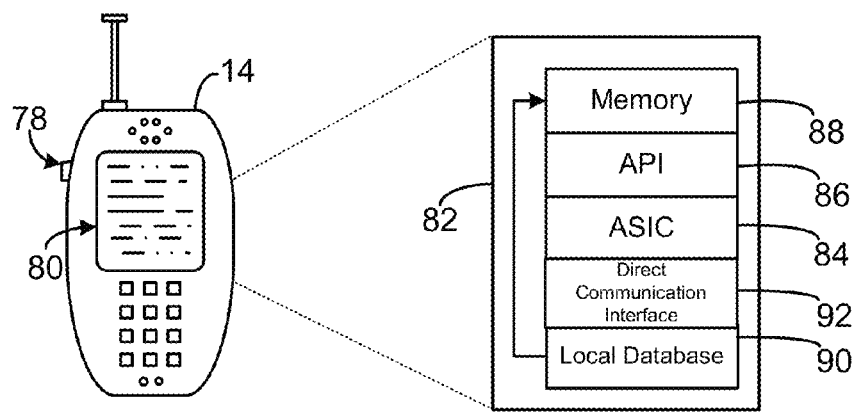
FIG. 3 depicts a block diagram illustrating the computer platform of the wireless telecommunications device with PTT capability.

FIG. 3 is a block diagram illustrating one embodiment of the wireless telecommunications device being a mobile telephone 14 with a PTT button 78 that opens the direct communication to a target set of devices, i.e. other members of the communication group 12. Other embodiments may use the keys that are normally available on a mobile telephone to perform similar functionality of the PTT button 78. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is typically installed at the time of manufacture of the wireless device. The ASIC 84 or other processor usually executes an application programming interface ("API") layer 86, which generally includes the resident application environment, and may include the operating system loaded on the ASIC 84. The resident application environment interfaces with any resident programs in the memory 88 of the wireless device. An example of a resident application environment is the "binary runtime environment for wireless" (BREW®) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open a group communication channel (typically half-duplex) from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
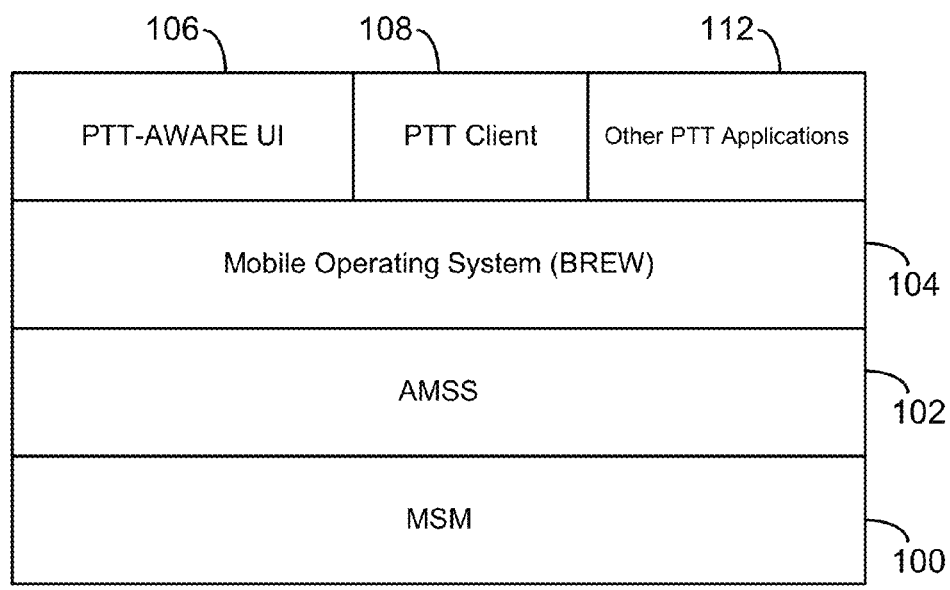
FIG. 4 depicts a diagram of one embodiment of the software layers of the communication group application, with a PTT client and a group-directed media client.

FIG. 4 is a diagram of one embodiment of the software layers of the group application client, with a PTT facility and a group-directed media facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM®, drives the underlying MSM chipset and implements the software protocol stack for the entire suite of CDMA communication technologies that include CDMA2000 1× and CDMA2000 1×EV-DO. There is a mobile operating system layer 104, which may be BREW®, also developed by QUALCOMM®, or any other mobile operating system available. The mobile operating system layer 104 generally provides for an application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as group media applications 112. In addition to providing access to PTT services with the PTT Client 108, the PTT Client 108 preferably acts as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

Figure 5:
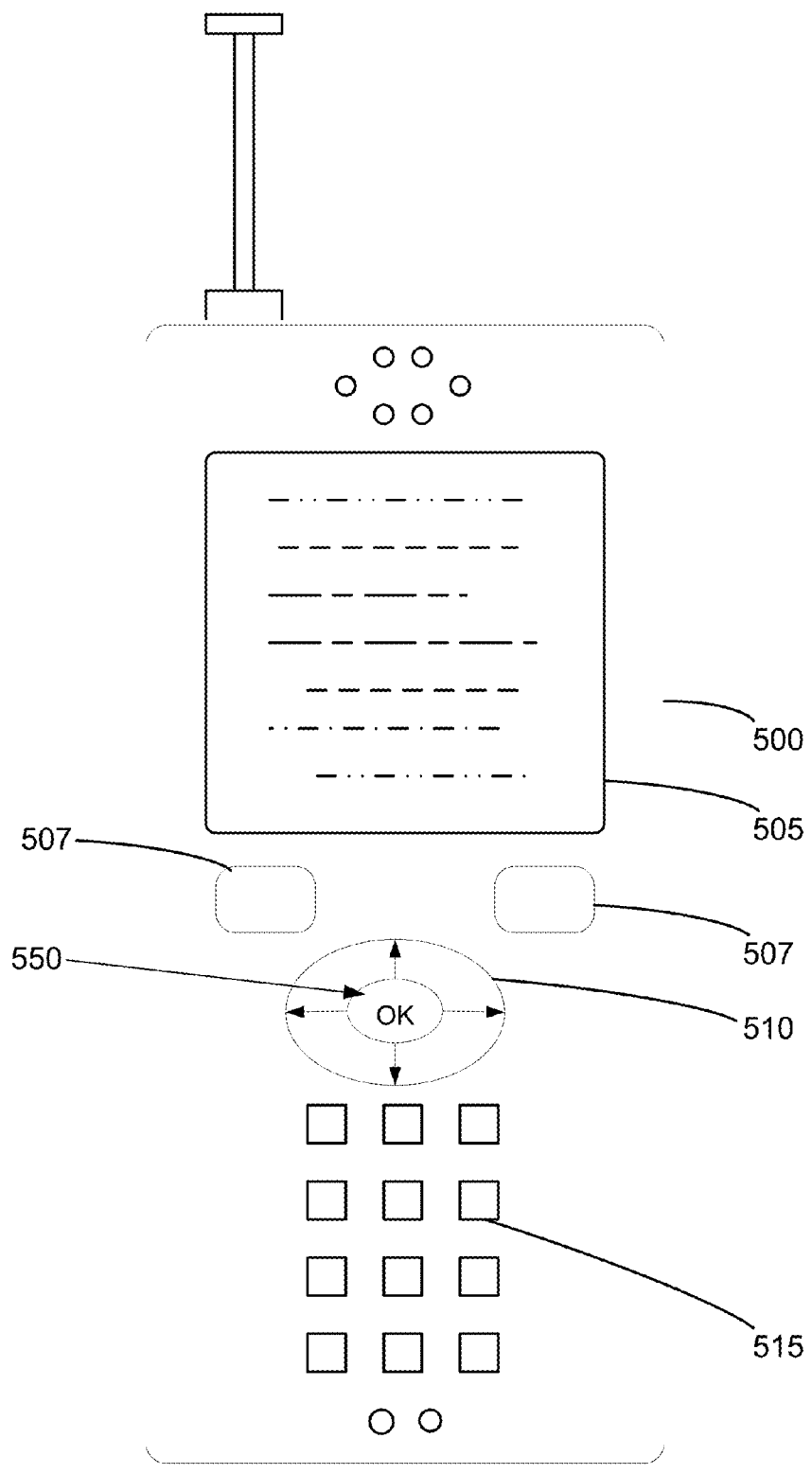
FIG. 5 depicts an exemplary mobile communications device.

Referring to FIG. 5, illustrated is an exemplary, non-limiting mobile communications device 500 and the user interface for the device. The device typically includes a display 505 that may comprise an LCD or OLED display. In some embodiments, the display may include touch screen capability. The device may include a keypad 515 that may be a standard phone keypad, or in other embodiments a QWERTY keypad. The device may also include navigation buttons 510 that may further comprise up, down, left, and right keys for navigating through the display 505. The navigation keys may further comprise a selection or OK key 550 to indicate the user's selection or acknowledgment of a particular function. The device may also include soft keys 507 that are programmable and may be used to select the function, for instance, as indicated in an area of display 505 near the soft key.

Figure 6:
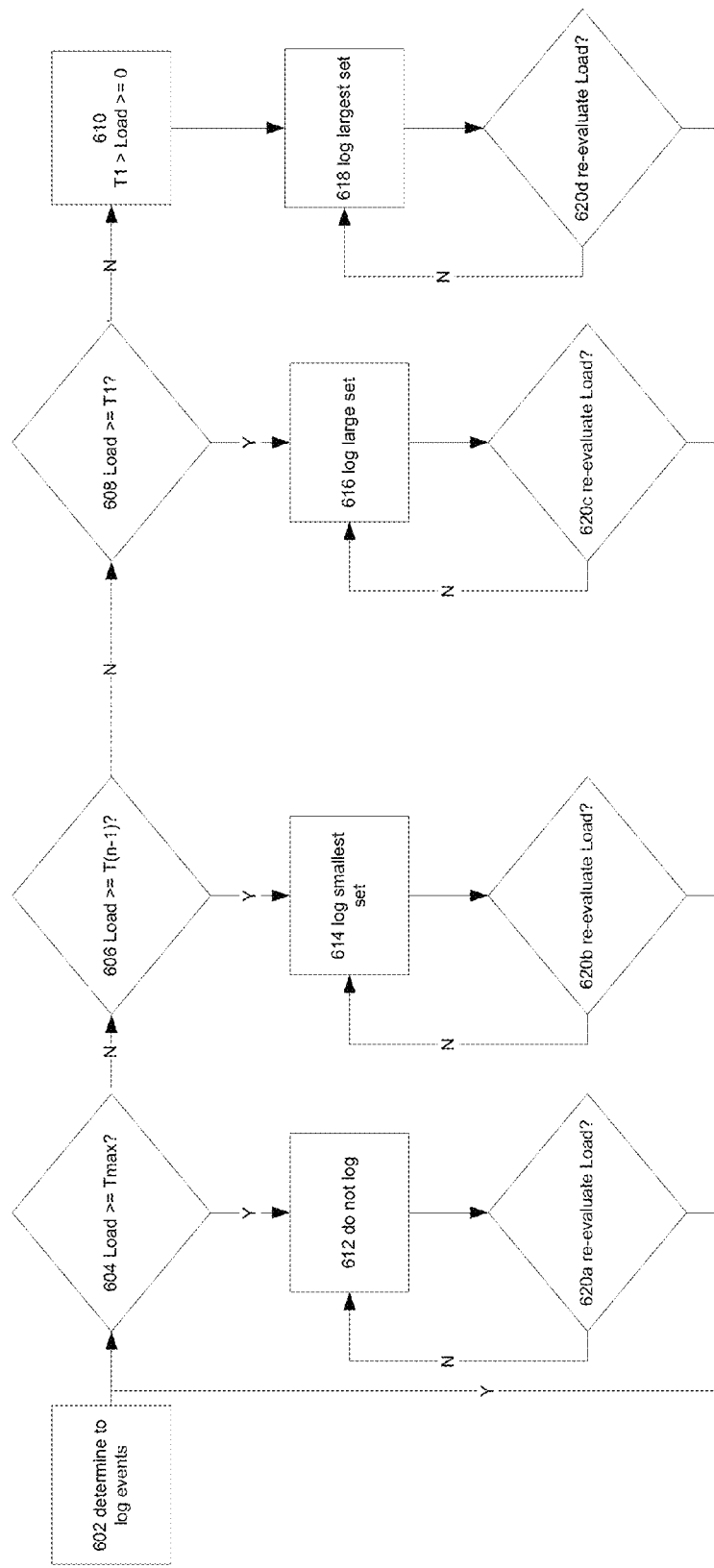
FIG. 6 depicts an exemplary process flow for adaptive diagnostic logging based on a load of a wireless communications system.

FIG. 6 depicts an exemplary process flow for adaptive diagnostic logging based on the available resources of a wireless communications system. The term "available resources" will be used interchangeably with "load" in this application. This process flow may be implemented on, for instance, a group communication server 32 or a handset 70 of FIG. 2. At 602, it is determined that events are to be logged. It may be determined that events are to be logged, for instance, as a result of a group communication server determining that a fault has occurred on the group communication server or a group communication of the group communication server. It may also be determined that events are to be logged, for instance, by a handset. For instance, a handset may log events based upon determining that the handset has a registration error in registering with a group communication server. It may also be determined that, where logging is generally an on-going activity, that a change in logging must be considered due to a change in the available resources of a wireless communications system. Therefore, the use of the term "fault" is meant to encompass all aspects of available resource utilization degradation, or other boundary situations which in time may lead to an error condition. For instance, while a fault may comprise abnormal operation of group communications within the wireless communications system (i.e., abnormally terminated group communications occurring at a rate above a threshold of acceptability). it may simply be the degradation of available resources such that continuation of logging may impact on-going communicative operations (i.e., a disk partition is filling up) or any other boundary situations which in time may lead to an error condition.

The process flow proceeds from 602 to a series of determinations of how much or which logging may occur, based on the load of the system. The first determination of how much logging may occur happens at 604, where it is determined whether a load is in excess of a maximum threshold for which logging may occur (Tmax). The maximum threshold (shown as Tmax) may be a singular determination, as an example, may be limited mobile device memory. Or Tmax thresholds may be derived from the combination of a number of resource utilizations, for example, memory, CPU and network utilization, etc. If it is greater than or equal to this threshold, the process flow moves to operation 612, where no logging occurs. It may be that no logging occurs when a load of the system is greater than or equal to Tmax because the additional load on the system due to logging would saturate the system. It may be that no logging occurs when a load of the system is greater than or equal to Tmax because, while the additional load on the system due to logging would not saturate the system, it would bring the load on the system so close to saturation that saturation would be likely reached by a small increase in system activity. It may also be that no logging occurs when a load of the system is greater than or equal to Tmax because, while the additional load on the system due to logging would not saturate the system, it may increase the load on the network such that others using the network would experience unfavorable network connectivity.

From 612, the process flow may periodically move to 620a. At 620a, it may be determined whether to re-evaluate the load relative to the thresholds (so as to determine whether a different level of logging is desired). If at 620a, the load is not to be re-evaluated (such as if an associated timer has not yet expired), then the process flow returns back to 612. If at 620a, the load is to be re-evaluated, the process flow returns back to 604.

If, at 604, it is determined that the load is less than Tmax, then the process flow moves to 606. At 606, it is determined whether the load is greater than or equal to threshold number n−1 (T(n−1)) (and, because the process flow came from 604, the load is less than Tmax). If the load is greater than or equal to T(n−1), the process flow moves to 614. At 614, the smallest set of events that is logged is logged (noting that, at 612, no events at all are logged). For instance, if load were not a consideration, it may be desirable to log 10 events, numbered sequentially, from 1 to 10. Where available load is scarce, such as is determined by 606, it may be that there is only enough load to log two of those events, such as event 3 and event 7, which may be the most desirable events to log given the available load.

The logging of different events may require different amounts of load. For instance, logging full information on call setup messaging may consume more load than logging Real-time Transport Protocol (RTP) packets. It may even be that the single most desired event to log is not logged even when there is sufficient load. For instance, if only one event may be logged, it may be most desirable to log event 2. However, if there is available load, it may be more desirable to log events 3 and 7 than event 2, since that combination may be more useful together than the event 2 log alone.

While at 614, this smallest set of events is logged. Therefore the example above, it would be most likely that event 2 would only be logged at this decision point. Furthermore, much as the process flow periodically moves from 612 to 620a, the process flow may periodically move from 614 to 620b, where is determined whether to re-evaluate the load. If load is to be re-evaluated, the process flow moves back to 604. If the load is not to be revaluated, the process flow returns to 614. Alternately, instead of periodically changing from 614 to 620b, the process can be updated in real time, in one embodiment, based upon a load module notifying a logging module when the load situation changes such that the logging module can make appropriate changes based upon real time network conditions.

If, at 606, it is determined that the load is less than T(n−1), the process flow moves to 608. As illustrated by the dashed line between 606 and 608, a larger number of thresholds may be used to compare against the load, allowing for a finer granularity of logging to be implemented. In other embodiments, a smaller number of thresholds may be used such as three (for instance, log many events; log a few events; and log no events).

At 608, it is determined whether a load is in excess of first threshold (T1) (and because the process flow came from 606, it is known that the load is less than T(n−1)). If the load is greater than or equal to T1, then the process flow moves to 616. At 616, a larger set of events is logged than is logged at 614, on account of the greater amount of load available with which to log. "Larger set" as used here relative to the "smallest set" of 614 does not necessarily mean a larger number of events logged. For instance, in one embodiment, it may be that while a load allows for at least an event 2 log (as per the example above), it may still not allow for the combination of events 3 and 7 which would be desirable. However, it may allow for more detailed logging information from the event 2 log. Additionally, it may simply refer to the fact that the set of events logged at 616 causes a larger load on the system than does the set of events logged at 614.

Much as how the process flow periodically moves from 612 to 620c, the process flow periodically moves from 616 to 620c. If, at 620c, it is determined that the load will not be re-evaluated, the process flow returns back to 616. If, at 620c, it is determined that the load will be re-evaluated, the process flow returns to 604.

If, at 608, it is determined that the load is less than T1, then the process flow moves to 610. When the process flow moves to 610, it is known that the load is less than T1, the lowest load threshold that affects the amount and type of logging of system events. Thus, the process flow moves to 618 where the full or largest set of events is logged. Much as in the discussion of "larger set" relative to "smaller set," "largest set" does not necessarily refer to the simple number of events logged, but may, for instance, refer to the combined load of logging all events of this largest set.

Much as how the process flow periodically moves from 612 to 620c, the process flow periodically moves from 618 to 620d. If, at 620d, it is determined that the load will not be re-evaluated, the process flow returns back to 618. If, at 620d, it is determined that the load will be re-evaluated, the process flow returns to 604.

It may be appreciated that while there are 4 (or N) number of levels of logging determinations depicted in FIG. 6 (604, 606, 608 and 610), more or fewer than 4 levels may be implemented in embodiments according to these teachings. It may also be appreciated that the depicted process for determining the amount of load may be implemented in a variety of ways (such as first determining whether the load is less than a first threshold; if it is not, determining whether it is less threshold number n−1; and if not, determining that it is greater than or equal to threshold number n).

The following illustrates three scenarios in which the techniques of adaptive logging based on load of FIG. 6 may be implemented. The first scenario involves call load, the second CPU load, and the third, available storage space ("disk load"). It may be appreciated that scenarios involving a combination of these loads may also benefit from the techniques of FIG. 6. Such a combination scenario may involve, for instance, a scenario where available system resources are constrained based on both call load and CPU load.

The first scenario involves an investigation of intermittent call quality issues, where the adaptive logging occurs based on the call load (the number of active calls). During off-peak times when there is load available to log all desired events, group communication server 32 collects full information on all calls (such as call setup messaging, floor control messaging, media, etc.). As peak times are entered (such as normal business hours), the adaptive logging techniques reduce the amount of data collected in states. The peak times correspond to a greater number of active calls, and at a point a first threshold of active calls is reached. In response to reaching this first threshold, group communication server 32 stops collecting media packets, and instead of collecting all Real-time Transport Protocol (RTP) packets, collects every tenth RTP packets. As load increases, a second threshold is reached. In response to reaching the second threshold, group communication server 32 stops collecting floor control messages and media entirely, and collects call setup information for only every tenth call. If load increases to where a third threshold is reached, group communication server 32 stops logging events entirely.

As the peak times are exited (such as at the end of a business day), load starts dropping and may fall below the three thresholds. In response to the load falling below thresholds, group communication server 32 may re-enable logging in the opposite order that it was disabled. When the load falls below the third threshold, group communication server 32 resumes collecting call setup information for every tenth call. As the load continues to drop, it falls below the second threshold, and in response, group communication server 32 resumes collecting data for every call, including all call setup messages, floor control messages and media. As the load continues to drop, it falls below the first threshold, and in response, group communication server 32 resumes logging full information for all calls.

In this first scenario, the information received as active call load increases is diminished, but still offers detail as to why poor system performance may be occurring. For instance, it may be determined from the information logged after a threshold has been reached that handsets on a particular region are consistently facing call quality problems, or that a single media channel (MCH) is involved in all of the determined call quality problems.

The second scenario involves adaptive logging based on the load of a CPU of group communication server 32 or a subcomponent of group communication server 32. In this second scenario, there is a problem with spurious data errors retrieving client information as part of client registration from a carrier provisioning database (a database that indicates which features of handsets may be utilized on the present network) communicatively coupled to group communication server 32. Initially, it cannot be determined if the problem is one of server processing, one of provisioned data, one of an error at the carrier provisioning database, or one of data being corrupted during transit.

To initially analyze this problem, there may be available CPU load to enable logging of all events that may be controlled: i.e., data sent to and received from the carrier provisioning database, data sent to and received from server components involved in registration, high-level processing details of subcomponents of group communication server 32 (such as a registration state machine, success or failure status at different group communication server 32 subcomponents), and low-level processing details of subcomponents of group communication server 32 (such as function entry and exits, and logic comparisons).

This initial logging is performed by all subcomponents involved with client registration. While the CPU load (or utilization) is below all thresholds, group communication server 32 subcomponents will log all of the above events. However, for instance, the caller identification (CID; caller ID) subcomponent is involved with both client registration and call setup, so a large call setup load can cause the CPU utilization of the CID subcomponent to increase even though other subcomponents that are involved with registration remain at low CPU levels. Once the CID subcomponent CPU load rises to be equal-to-or-greater-than a first threshold, the CID subcomponent stops logging the low-level processing events for registrations, but continues logging registration-related messages that are sent or received, as well as high-level processing events (such as a client being successfully added to or removed from a cache of the CID subcomponent). Other subcomponents of group communication server 32 continue to log as many events as before the first threshold of the CID subcomponent was reached, because they are below their respective thresholds. However, depending upon the type of change in the available resources of a wireless communications system as well as the possible error type encountered, it may be determined that other subcomponents reduce their use of resources for logging such that the possible offending subcomponent can log at a greater level. Furthermore, other modules can be utilized in the present system to ease loading in the logging such that the logging module which has more chance to capture the critical information can log in greater details.

Similar as discussed with respect to the first scenario, as CPU load on the CID subcomponent increases, and additional thresholds are reached, progressively less logging of events occurs. As CPU load on the CID subcomponent decreases, and the load drops below previously reached thresholds, progressively more logging of events resumes (or occurs for the first time, where logging began at a point where CPU load was already above at least a first threshold).

By logging data at a plurality of subcomponents, the source of a problem may be more easily identified, wherein the source of the problem was logging appropriate events at the time the error occurred or where a plurality of errors occurred of the same nature, this source was logging appropriate events at a time an error occurred. In the case of a severely flawed subcomponent (such as one that reports incorrect information) or a subcomponent that was so loaded that adaptive logging was either very low, or no logging at all occurred, the problem could be determined to be as a result of that subcomponent causing the load (i.e., the absence of that particular subcomponent's log). Where the problem is determined to be as a result of that subcomponent, some insight into the problem may be gleaned from information sent to or received from the subcomponent by other subcomponents that are logging events.

The third scenario involves adaptive logging based on the availability of storage space (such as provided by a hard disk, or other storage medium) with which to store the results of logging. In this scenario, it is desired to collect information at the central storage billing unit (CSBU), a subcomponent of group communication server 32 that is responsible for storing billing information until it can be retrieved by a carrier billing system of a wireless communications network. As with the previous two scenarios, there are multiple levels of logging that may be implemented. In the present scenario, the CSBU logs varying amounts of events based on available storage space. If available storage space drops to a first threshold (for instance, 50% of the total storage space of the hard disk), the detail of what is logged is reduced. If available storage space drops to a second threshold (for instance, 40% of the total storage space of the hard disk), the detail of what is logged is further reduced. If available storage space drops to a third threshold (for instance, 25% of the total storage space of the hard disk), logging is stopped. If the billing records are then sent to the carrier billing system, and deleted on the storage device, freeing space (for instance, to 80% of the total storage space of the hard disk), the CSBU may continue to log as before it reached the first threshold. This adaptive logging provides information valuable in diagnosing a problem with the CSBU, but prioritizes the revenue-generating activity of billing above log collection.

Figure 7:
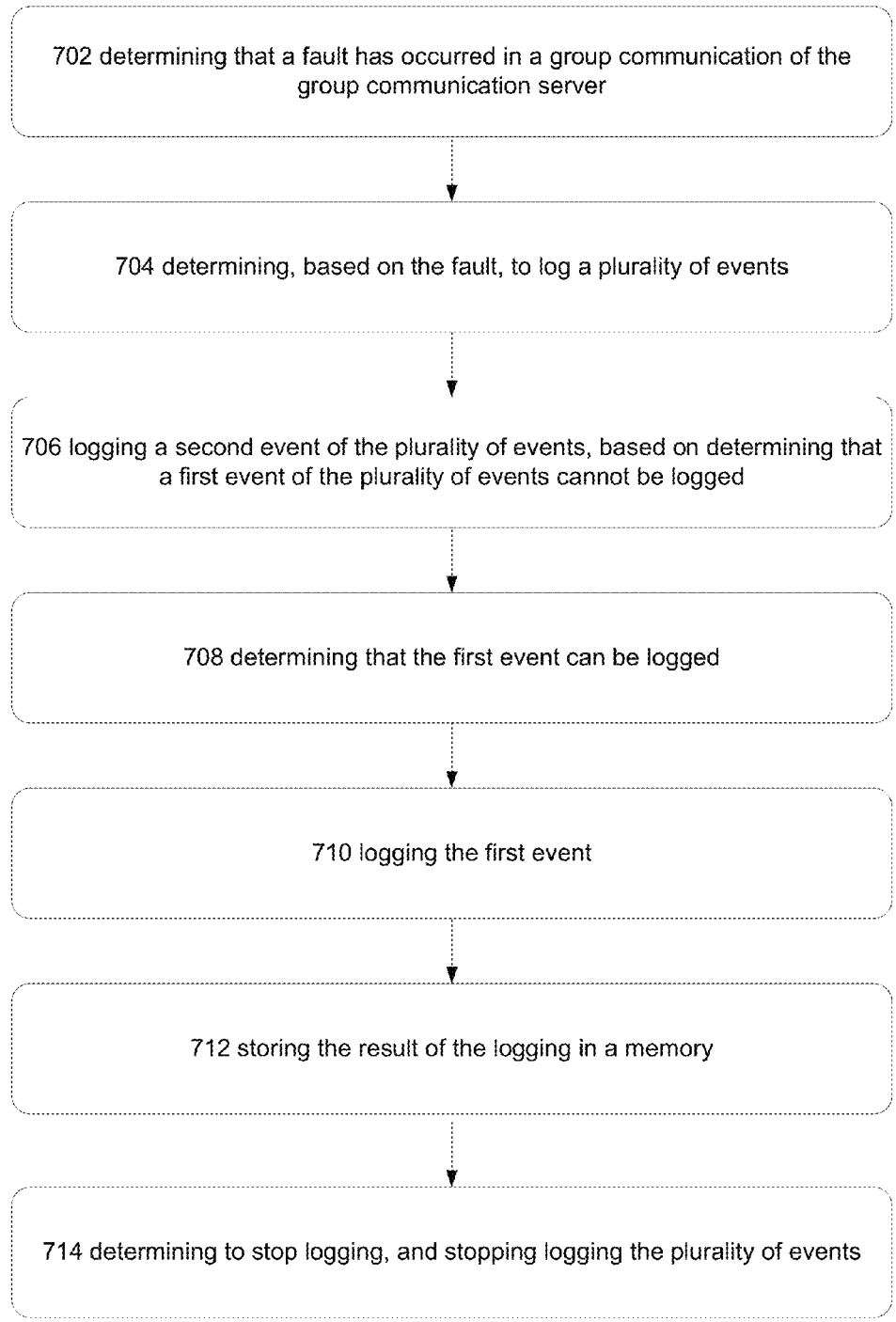
FIG. 7 depicts exemplary operational procedures for adaptive diagnostic logging based on the varying ability to log events.

FIG. 7 depicts exemplary operational procedures for adaptive diagnostic logging based on the varying ability to log events. This varying ability to log events may occur, for instance, where group communication server 32 cannot communicate with a subcomponent, or where a subcomponent cannot log all events desired to be logged because it is experiencing too high a load (such as active call load, or CPU load).

Operation 702 depicts determining that a "fault" has occurred in a group communication of the group communication server. As an example, in this case the fault may comprise abnormal operation of the group communication, such as inability of a handset of the group communication to participate in the group communication where it otherwise should be able to because it is within range to communicate to a base transceiver station (BTS). It may be determined that a fault has occurred when it is determined that this abnormal operation is occurring, for instance where the handset of the group communication fails to send an ACK packet to group communication server 32 in response to being sent an ANNOUNCE packet by group communication server 32. It may also be determined that a fault has occurred, for instance, when a BTS is dropping a number of calls that exceeds a threshold of acceptability.

Operation 704 depicts determining, based on the fault, to log a plurality of events. In response to determining that the fault has occurred, logging one or more events may be initiated, so as to gather data with which to analyze the nature of the fault and discern a way to resolve the problem. The events that are to be logged in response to a fault may be tailored to the fault itself. For instance, if the fault is of type A, then the events that are to be logged may be events W, X, Y, and Z, but if the fault is of type B, then the events that are to be logged may be events S, T, U, X, and Z. This pre-determined plurality of events may be thought of as a logging template—a set of events that are logged together in response to a particular type of fault.

The events of indicated by the logging template may be selected to be events, the logging of which is determined to be likely to identify a source of the fault. For instance, where the fault is one of a failure to establish a group communication, the events logged may include all call setup messaging.

In an embodiment, determining to log a plurality of events is based on a load threshold. For instance, the plurality of events may be selected based on whether a load of a component exceeds a threshold or not (for instance, 604). Where a load of a component exceeds a threshold that indicates that there is relatively little available load available for logging, a smaller set of events (or a set that consumes less load) may be determined to be logged than if the load of the component exceeds no such threshold that makes such an indication.

Operation 706 depicts logging a second event, based on determining that a first event of the plurality of events cannot be logged. It may be that the first event is signal strength of a handset of the group communication, such as handset 70, and that the handset is not responding to requests to identify its signal strength. It may also be that the component in question lacks sufficient load to log the first particular event (because the additional load associated with logging the first event would cause the component to exceed its maximum load). For instance, a group communication server may not have enough storage space to log the first event—full information of all calls (call setup messaging, floor control messaging, and media), so may instead log a second event that it does have storage space to log, such as only call setup messaging. Note that the second event may be other than a subset of the first event, which is the example used here.

Operation 708 depicts, after beginning logging the second event, determining that the first event can be logged. Using an example discussed with respect to operation 706, it may be determined that the group communication server now does have enough storage space to log the first event (full information of all calls).

Operation 710 depicts logging the first event. Above, it was initially desired to log the first event, but for a reason the first event could not be logged, so instead the second event was logged. Now that time has passed during the logging, it has been determined that the first event is now available to be logged, and in operation 710 the first event is logged (for instance, see 620a). This may include stopping logging the second event (such as where there is not enough available load to load both the first event and the second event, but there is enough available load to log either the first event or the second event), logging portions of the second event, or continuing logging the second event.

Operation 712 depicts storing the result of the logging in a memory. This may be stored in a storage medium of the component logging the event. For instance, where a plurality of handsets each log signal strength, that may be stored in a memory of each handset. This may also be stored in a centralized storage medium. Using this plurality of handsets example, each handset may send an indication of its signal strength to a group communication server where each indication is stored in a storage medium of the group communication server.

Operation 714 depicts determining to stop logging; and stopping logging the plurality of events. This determination to stop logging may occur upon logging a specific event, such as the transfer of a media in a group communication where the fault dealt with a problem with the transfer of media.

This determination to stop logging may occur upon an expiration of a timer. For instance, a 5-minute timer may be initialized and started when logging commences, and logging may be stopped five minutes later, upon expiration of that timer.

This determination to stop logging may occur based on a load threshold being reached. For instance, call connection problems may occur only when the active call load is above a threshold, or when another (for instance, CPU) load of a component is above another threshold. When the load drops below this load threshold, it may be determined to stop logging.

This determination to stop logging may occur based on receiving an indication of a user's desire to stop logging. This may comprise receiving a signal indicative of user interaction with the present system that corresponds to manual termination of the logging.

Figure 8:
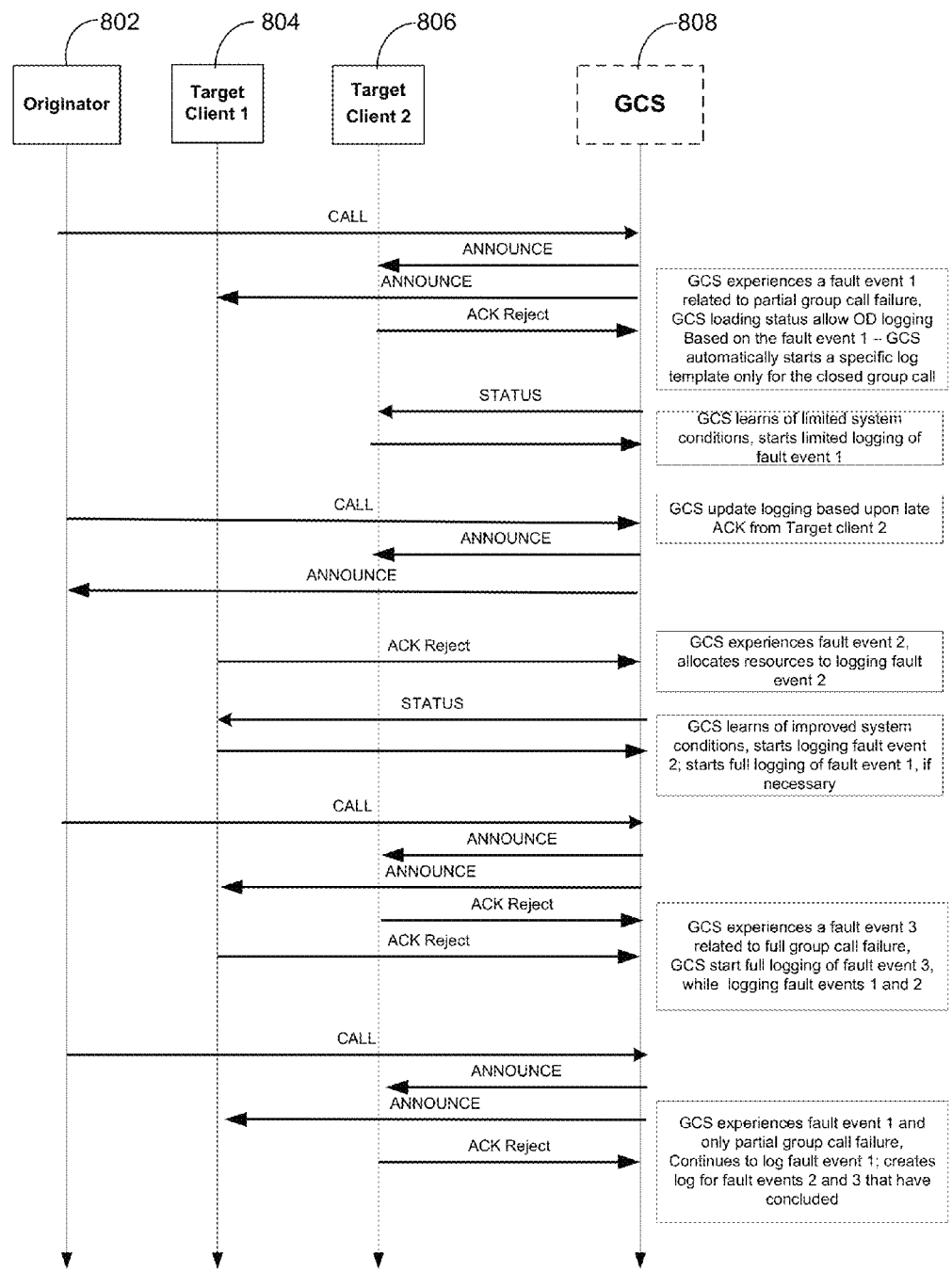
FIG. 8 depicts an exemplary call flow diagram adaptive diagnostic logging of a group communication.

FIG. 8 depicts an exemplary call flow diagram adaptive diagnostic logging of a group communication. There are three handsets 802, 804 and 806 in communication with group communication server 808. Each of handsets 802, 804, and 806 may comprise, for instance, handset 70 of FIG. 1. Group communication server 808 may comprise, for instance, group communication server 32 of FIG. 1.

Handset 802 attempts to initiate a group communication with handsets 804 and 806. Handset 802 attempts to accomplish this by sending a CALL message to group communication server 808, which indicates that handsets 804 and 806 are to participate in this group communication. In response to receiving the CALL message, group communication server 808 sends separate ANNOUNCE messages to handset 804 and handset 806. In response to the ANNOUNCE message sent to handset 804, group communication server 808 receives from handset 804 an ACK (acknowledgement) message. However, in response to the ANNOUNCE message sent to handset 806, group communication server 808 receives from handset 806 an ACK REJECT message. Since handset 806 has rejected the call, but handset 804 has accepted it, this results in a fault comprising a partial group call failure.

In response to determining that a partial group call failure has occurred for the group communication between handsets 802, 804 and 806, group communication server 808 may initiate logging. In an embodiment, this logging may comprise logging the full detail of all messages sent to and received from the handsets of this group communication that is experiencing a partial call failure. What is logged may be determined by a template of events to log. Group communication server 808 may have stored thereon a plurality of templates, the templates corresponding to different types of faults. In this embodiment, where group communication server 808 determines that the fault is a partial call failure, it may select from its plurality of templates the template corresponding to a partial call failure. There may further be multiple templates corresponding to a single fault type that are distinguished based on the availability of an event to be logged (e.g. whether a particular handset may currently transmit information on its signal strength) or the amount of resources available with which to log (e.g. whether group communication server 808 has sufficient resources to log the events of the template, or whether doing so would cause it to exceed a maximum load threshold). In an embodiment where there are these plurality of templates corresponding to a single fault event, a template of the plurality of templates may be selected based on the current status of the system.

In an embodiment where the logging comprises logging the full detail of all messages sent to and received from the handsets of this group communication that is experiencing a partial call failure, group communication server 808 logs these events (in an embodiment, some of these events may be logged on other components of the group communication, such as handset 802). Group communication server 808 then sends a STATUS message to handset 806), and receives a STATUS message from handset 806 to learn of network conditions. Here, the GCS 808 learns of limited network conditions and therefore starts limited logging of information related to fault event 1, the partial group call failure. In an embodiment, group communication server 808 continues to log after sending the STATUS message to handset 806. In an embodiment, group communication server 808 can also sends the STATUS message to handset 802 before beginning to log to capture more system data, such as data for handset 802. In an embodiment, group communication server 808 may continue to log these events even after capturing one partial call failure, such as by logging until a larger number of partial call failures are logged (so as much information about the fault type as possible), until a load threshold has been reached, or until receiving an indication that a user wishes to halt logging.

Then, a second group call occurs from handset 802 and an ACK reject is received from handset 804. The GCS 808 thus experiences fault event 2, a partial group call failure and then inquires of the status of handset 804. Once data is received on the status of handset 804, GCS 808 learns of improved system conditions and increases the resources available to log fault event 1 and begins to log data relative to fault event 2.

Then, a third group call occurs from handset 802 and an ACK reject is received from handsets 804 and 806. The GCS 808 thus experiences fault event 3, a full group call failure and then begins to log fault event 3. However a fourth call is then sent from handset 802 and only an ACK reject is received from handset 806. GCS 808 continues to log fault event 1, and then creates a log for fault events 2 and 3 that have concluded and stores the data relative to those events. Afterward, the GCS 808 could again check the status of handset 808 to learn of network conditions and/or data about handset 806.

Figure 9:
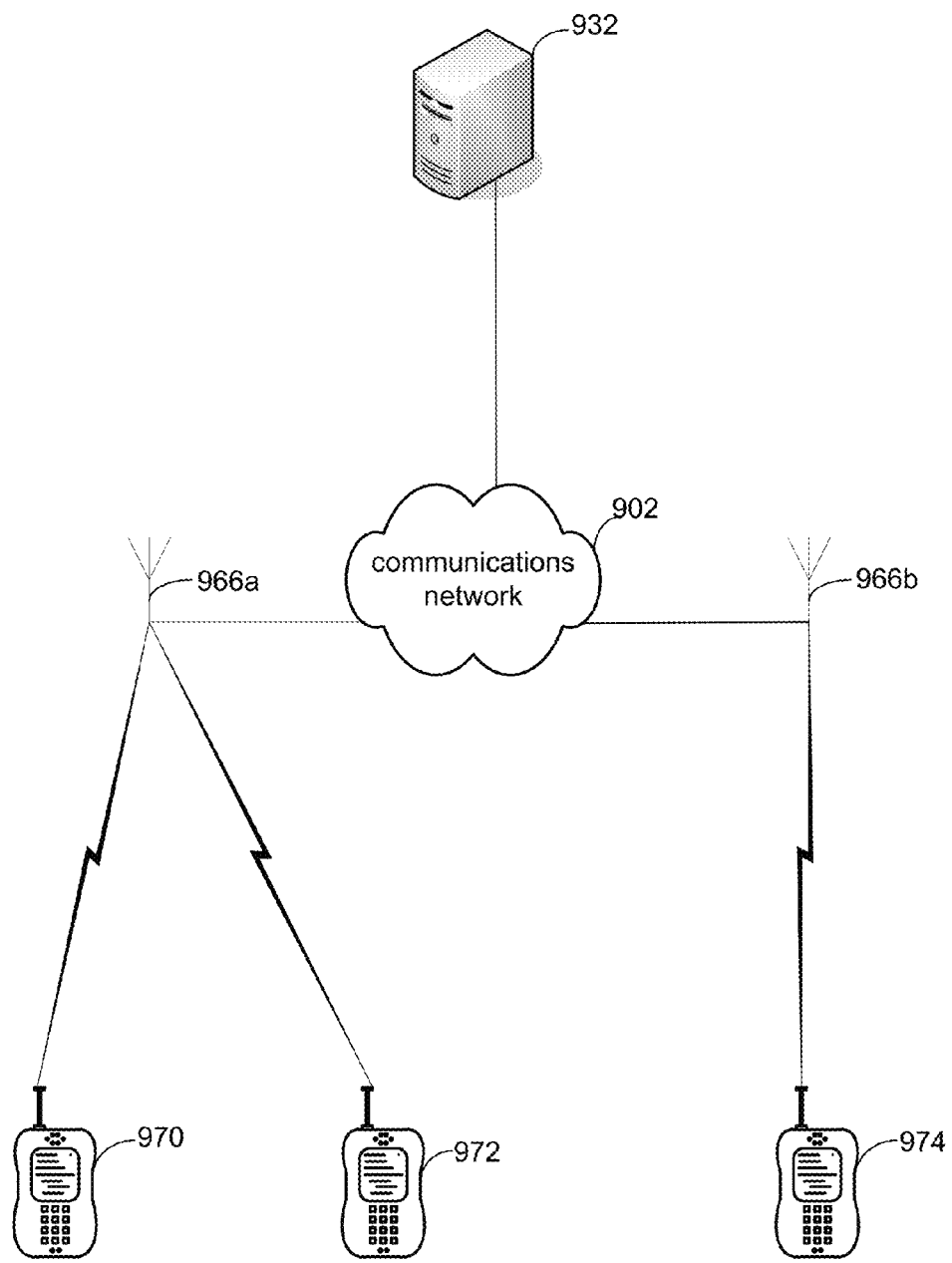
FIG. 9 depicts an exemplary wireless communications system in which the group communication server conducts adaptive diagnostic logging of a group communication.

FIG. 9 depicts an exemplary wireless communications system in which the group communication server conducts adaptive diagnostic logging of a group communication. Group communication server 932 may comprise group communication server 32 of FIG. 2. Handsets 970, 972, and 974 may comprise one of handsets 70, 72, 74, or 76 of FIG. 2. BTS' 966a and 966b may comprise BTS 66 of FIG. 2. Group communication server 932, and BTS' 966a and 966b may communicate with each other via communications network 902.

Handsets 970, 972, and 974 may attempt to communicate in a group communication. In the course of this attempted group communication, a fault may be determined, such as the fault depicted in FIG. 8. When group communication server 932 determines that a fault has occurred, it may initialize adaptive logging.

Group communication server 932 may itself log events that can be determined at the point of group communication server 932, such as a details of a CALL message received from handset 970. Group communication server 932 may also send indications to other components of the wireless communications system to perform localized logging. For instance, it may indicate to handset 970 to begin logging its signal strength, and to store the results of that logging locally in a memory of handset 970. Handset 970 may then send the results of the logging that occurred on handset 970 to group communication server 932. In another embodiment, handset 970 sends group communication server 932 the results of logging as events are logged. Group communication server 932 ultimately collects all of the results of the logging, be the logging performed on group communication server 932 or on another component. Then, the results of the logging may be retrieved from group communication server 932 and analyzed by technicians to determine the source of the fault, and appropriate remedial action to fix the fault.

An example of where "indirect" logging may be performed involves the vocoder. It may be that a vocoder cannot perform logging on itself directly, because doing so would increase its load too much—such as the increased load may cause its queue of voice data to encode would overflow. Rather than direct logging performed by the vocoder on the vocoder, indirect logging of the vocoder may occur. This indirect logging may comprise logging the packets sent from the vocoder.

Logging of components of a wireless communications system may occur, even when those components cannot communicate with each other at a given time. For instance, in the system depicted in FIG. 9, both handset 970 and handset 972 may experience a similar fault when in communication with BTS 966a, such as being unable to communicate with group communication server 932. Each handset may independently begin adaptively logging events possibly related to the fault. Later, handsets 970 and 972 may physically move, such that they are now in communication with BTS 966b, and through BTS 966b are able to communicate with group communication server 932. At this point, since the fault no longer occurs, they may stop logging (if the handsets have not previously stopped logging, such as due to the expiration of a timer), and upload the results of their logging to group communication server 932, where the logs may be aggregated, for retrieval by a technician who may analyze them to determine the reason for the fault.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed is:

1. A method for diagnosing faults in a group communication in a wireless communications network, comprising:
   determining that a particular type of fault has occurred in the group communication between wireless communication devices;
   determining a first set of events for logging based on a logging template in response to the particular type of fault, wherein events within the first set of events are associated with one another and with the particular type of fault;
   determining that an event within the first set of events is not available for logging;
   logging a second set of events based on the logging template after the determination is made that the event within the first set of events is not available for logging, wherein events within the second set of events are associated with one another and with the particular type of fault;
   after beginning the logging of the second set of events, determining that the event within the first set of events which was not available earlier for logging is currently available for logging;
   logging the first set of events and stopping the logging of the second set of events in response to determining that the event within the first set of events which was not available earlier for logging is currently available for logging; and
   storing results of the logging of the first set of events and the second set of events in a memory.

2. The method of claim 1, wherein storing the results of the logging of the first set of events and the second set of events in the memory occurs on a wireless communications handset, further comprising:
   sending the results of the logging of the first set of events and the second set of events to a group communication server.

3. The method of claim 1, wherein determining the first set of events for logging is based on a value of a key performance indicator (KPI).

4. The method of claim 1, wherein determining the first set of events for logging is based on a rate of occurrence of the particular type of fault.

5. The method of claim 1, further comprising:
   determining to stop logging of a specific event of the first set of events; and
   stopping the logging of the specific event of the first set of events.

6. The method of claim 5, wherein determining to stop the logging of a specific event of the first set of events comprises:
   determining to stop the logging of the specific event of the first set of events based on an expiration of a timer.

7. The method of claim 5, wherein determining to stop the logging of the specific event of the first set of events comprises:
   determining to stop the logging of the specific event of the first set of events based on a load threshold being reached.

8. The method of claim 5, wherein determining to stop the logging of the specific event of the first set of events comprises:
   determining to stop the logging of the specific event of the first set of events based on receiving an indication of a user's desire to stop the logging of the specific event of the first set of events.

9. A system for diagnosing faults in a group communication in a wireless communications network, comprising:
   means for determining that a particular type of fault has occurred in the group communication between wireless communication devices;
   means for determining a first set of events for logging based on a logging template in response to the particular type of fault, wherein events within the first set of events are associated with one another and with the particular type of fault;

means for determining that an event within the first set of events is not available for logging;

means for logging a second set of events based on the logging template after the determination is made that the event within the first set of events is not available for logging, wherein events within the second set of events are associated with one another and with the particular type of fault;

means for determining, after beginning the logging of the second set of events, that the event within the first set of events which was not available earlier for logging is currently available for logging;

means for logging the first set of events and stopping the logging of the second set of events in response to determining that the event within the first set of events which was not available earlier for logging is currently available for logging; and means for storing results of the logging of the first set of events and the second set of events in a memory.

10. A system for diagnosing faults in a group communication in a wireless communications network, comprising:
a processor;
a first memory communicatively coupled to the processor, bearing machine-readable instructions, that when executed on the processor, cause the processor to perform operations comprising:
determining that a particular type of fault has occurred in the group communication between wireless communication devices;
determining a first set of events for logging based on a logging template in response to the particular type of fault, wherein events within the first set of events are associated with one another and with particular type of the fault;
determining that an event within the first set of events is not available for logging;
logging a second set of events based on the logging template after the determination is made that the event within the first set of events is not available for logging, wherein events within the second set of events are associated with one another and with the particular type of fault;
after beginning the logging of the second set of events, determining that the event within the first set of events which was not available earlier for logging is currently available for logging;
logging the first set of events and stopping the logging of the second set of events in response to determining that the event within the first set of events which was not available earlier for logging is currently available for logging; and
storing results of the logging of the first set of events and the second set of events in a second memory.

11. The system of claim 10, wherein storing the results of the logging of the first set of events and the second set of events in the second memory occurs on a wireless communications handset, and the first memory further bears machine-readable instructions, that when executed on the processor, cause the processor to perform operations comprising:
sending the results of the logging of the first set of events and the second set of events to a group communication server.

12. The system of claim 10, wherein determining the first set of events for logging is based on a value of a key performance indicator (KPI).

13. The system of claim 10, wherein determining the first set of events for logging is based on a rate of occurrence of the particular type of fault.

14. The system of claim 10, wherein the first memory further bears machine-readable instructions, that when executed on the processor, cause the processor to perform operations comprising:
determining to stop logging of a specific event of the first set of events; and
stopping the logging of the specific event of the first set of events.

15. The system of claim 14, wherein determining to stop the logging of the specific event of the first set of events comprises:
determining to stop the logging of the specific event of the first set of events based on an expiration of a timer.

16. The system of claim 14, wherein determining to stop the logging of the specific event of the first set of events comprises:
determining to stop the logging of the specific event of the first set of events based on a load threshold being reached.

17. The system of claim 14, wherein determining to stop the logging of the specific event of the first set of events comprises:
determining to stop the logging of the specific event of the first set of events based on receiving an indication of a user's desire to stop the logging of the specific event of the first set of events.

18. A non-transitory computer-readable medium storing computer executable code for diagnosing faults in a group communication in a wireless communications network, comprising:
code for determining that a particular type of fault has occurred in the group communication between wireless communication devices;
code for determining a first set of events for logging based on a logging template in response to the particular type of fault, wherein events within the first set of events are associated with one another and with the particular type of fault;
code for determining that an event within the first set of events is not available for logging;
code for logging a second set of events based on the logging template after the determination is made that the event within the first set of events is not available for logging, wherein events within the second set of events are associated with one another and with the particular type of fault;
code for, after beginning the logging of the second set of events, determining that the event within the first set of events which was not available earlier for logging is currently available for logging;
code for logging the first set of events and stopping the logging of the second set of events in response to determining that the event within the first set of events which was not available earlier for logging is currently available for logging; and
code for storing results of the logging of the first set of events and the second set of events in a memory.

19. The non-transitory computer-readable medium of claim 18, further comprising:
code for sending the results of the logging to a group communication server.

20. The non-transitory computer-readable medium of claim 18, wherein determining the first set of events for logging is based on a value of a key performance indicator (KPI).

21. The non-transitory computer-readable medium of claim 18, wherein determining the first set of events for logging is based on a rate of occurrence of the particular type of fault.

22. The non-transitory computer-readable medium of claim 18, further comprising:
   code for determining to stop logging of a specific event of the first set of events; and
   code for stopping the logging of the specific event of the first set of events.

23. The non-transitory computer-readable medium of claim 22, wherein determining to stop the logging of the specific event of the first set of events comprises:
   determining to stop the logging of the specific event of the first set of events based on an expiration of a timer.

24. The non-transitory computer-readable medium of claim 22, wherein determining to stop the logging of the specific event of the first set of events comprises:
   determining to stop the logging of the specific event of the first set of events based on receiving an indication of a user's desire to stop logging.

25. A method for diagnosing faults in a group communication in a wireless communications network, comprising:
   determining that a particular type of fault has occurred in the group communication between wireless communication devices;
   determining a first set of events for logging based on a logging template in response to the particular type of fault, wherein events within the first set of events are associated with one another and with the particular type of fault;
   determining that an event within the first set of events is not available for logging;
   logging a second set of events after based on the logging template the determination is made that the event within the first set of events cannot be determined for logging, wherein events within the second set of events are associated with one another and with the particular type of fault;
   after beginning the logging of the second set of events, determining that the event within the first set of events which was not available earlier for logging is currently available for logging;
   logging the first set of events and stopping the logging of the second set of events in response to determining that the event within the first set of events which was not available earlier for logging is currently available for logging; and
   storing results of the logging of the first set of events and the second set of events in a memory.

* * * * *